(12) United States Patent
Krumrine et al.

(10) Patent No.: US 10,240,443 B2
(45) Date of Patent: Mar. 26, 2019

(54) ALKALI METAL SILICIDES FOR HIGH TEMPERATURE WETTABILITY IMPROVEMENT IN CARBONATE RESERVOIRS

(71) Applicant: SIGNA CHEMISTRY, INC., New York, NY (US)

(72) Inventors: Paul H. Krumrine, Hanover, PA (US); Michael Lefenfeld, New York, NY (US); Gregory Arthur Romney, Coeur D'Alene, ID (US); Muhammad Imran, Regina (CA); Kelvin Dean Knorr, Regina (CA); Ralph George Jonasson, Regina (CA)

(73) Assignee: SIGNA CHEMISTRY, INC., New York, NY (US)

(*) Notice: Subject to any disclaimer, the term of this patent is extended or adjusted under 35 U.S.C. 154(b) by 148 days.

(21) Appl. No.: 15/028,149

(22) PCT Filed: Oct. 17, 2014

(86) PCT No.: PCT/US2014/061273
§ 371 (c)(1),
(2) Date: Apr. 8, 2016

(87) PCT Pub. No.: WO2015/058170
PCT Pub. Date: Apr. 23, 2015

(65) Prior Publication Data
US 2016/0265328 A1    Sep. 15, 2016

Related U.S. Application Data (60) Provisional application No. 61/892,222, filed on Oct. 17, 2013.

(51) Int. Cl.
*E21B 43/25* (2006.01)
*E21B 43/16* (2006.01)
(Continued)

(52) U.S. Cl.
CPC ............. *E21B 43/25* (2013.01); *C09K 8/58* (2013.01); *C09K 8/592* (2013.01); *C09K 8/594* (2013.01);
(Continued)

(58) Field of Classification Search
CPC ....................................................... E21B 43/25
See application file for complete search history.

(56) References Cited

U.S. PATENT DOCUMENTS 2,204,113 A    6/1940    Allen
7,932,329 B2   4/2011    Ito et al.
(Continued)

FOREIGN PATENT DOCUMENTS

CN    1480628 A      3/2004
CN    101680294 A    3/2010
(Continued)

OTHER PUBLICATIONS

International Search Report and Written Opinion in corresponding International Application No. PCT/US2014/061273, dated Mar. 20, 2015.
(Continued)

*Primary Examiner* — William D Hutton, Jr.
*Assistant Examiner* — Avi T Skaist
(74) *Attorney, Agent, or Firm* — J.A. Lindeman & Co., PLLC (57) ABSTRACT

A process for altering a wettability characteristic of a carbonate formation to stimulate oil production includes selecting an oil bearing carbonate formation, injecting a silicide dispersion into the carbonate formation, and reacting the injected silicide dispersion with water. The reaction alters the wettability characteristic of the carbonate formation toward water wettability. The silicide dispersion can include an alkali metal silicide, such as sodium silicide. The reaction
(Continued)

generates hydrogen, silicate, and heat that pressurizes the carbonate formation with the generated hydrogen, heats the carbonate formation with the generated heat, and reduces the viscosity of the hydrocarbons in the carbonate formation with the generated silicate. The reaction re-mineralizes the surfaces in the carbonate formation and alters the wettability characteristics of the carbonate formation as a calcium-silicon phase is formed. The hydrocarbons are recovered from the carbonate formation with a production well.

20 Claims, 9 Drawing Sheets

(51) Int. Cl.
    *C09K 8/592*     (2006.01)
    *E21B 43/24*     (2006.01)
    *C09K 8/58*     (2006.01)
    *C09K 8/594*     (2006.01)

(52) U.S. Cl.
    CPC .............. *E21B 43/16* (2013.01); *E21B 43/24* (2013.01); *E21B 43/255* (2013.01)

(56) References Cited

U.S. PATENT DOCUMENTS

| | | |
|---|---|---|
| 8,061,424 B2 | 11/2011 | Willberg et al. |
| 8,146,664 B2 | 4/2012 | Kaminsky et al. |
| 8,685,902 B2 | 4/2014 | Pershikova et al. |
| 8,962,536 B2 | 2/2015 | Winslow et al. |

FOREIGN PATENT DOCUMENTS

| | | |
|---|---|---|
| CN | 101932542 A | 12/2010 |
| RU | 2346971 C2 | 2/2009 |
| RU | 2404359 C2 | 11/2010 |
| WO | 2012/174255 A1 | 12/2012 |

OTHER PUBLICATIONS

International Search Report and Written Opinion in corresponding International Application No. PCT/US2014/061273, dated Apr. 1, 2015.
International Preliminary Report on Patentability in corresponding International Application No. PCT/US2014/061273, dated Apr. 28, 2016.
Hirasaki et al., "Surface Chemistry of Oil Recovery From Fractured, Oil-Wet, Carbonate Formations", SPE Journal, Jun. 2004, pp. 151-162.

ALKALI METAL SILICIDES FOR HIGH TEMPERATURE WETTABILITY IMPROVEMENT IN CARBONATE RESERVOIRS

CROSS-REFERENCE TO RELATED APPLICATION

This application claims priority to U.S. Provisional Patent Application No. 61/892,222 filed on Oct. 17, 2013, the entire contents of which are incorporated by reference in this application.

TECHNICAL FIELD

This invention relates to systems and methods for altering surface wettability of carbonate reservoirs for increasing the amount of crude oil extracted from the reservoirs. The invention also relates to alkali metal silicide systems and methods for improving recovery and increasing the amount of crude oil that can be extracted from a carbonate reservoir.

BACKGROUND

Carbonate Formations Background

Oil-bearing carbonate formations are said to comprise over 50% of the known hydrocarbon bearing resources. The formations are predominantly comprised of calcite and dolomite with other interspersed mineralogy. Porosity in these formations results from macro features such as fractures, vugs, and breccia deposits as well as micro porous features. While the micro porous aspects tend to have quite low permeability for movement of fluids, the macro features can exhibit permeabilities of 1 to 10 Darcies or more.

Heavy oil reserves in carbonate formations are generally some of the most difficult resources to produce and recover. A prime example is the Grosmont formation in Alberta, Canada. Primary production via natural reservoir pressure may recover only a small fraction of the in situ resource. Poor primary recovery is due to both the viscous nature of the hydrocarbons with capillary forces preventing efficient recovery efforts and the carbonate wetting characteristics being highly oil wet. Because of the high viscosity, water flood secondary techniques are not viable, so operators are forced to immediately proceed to tertiary techniques employing steam, acids and/or solvents. The carbonate surfaces tend to be oil wet as certain naphthenic acid fractions convert the carbonate into the calcium salt which forms insoluble attachment points to the carbonate surfaces. To address the viscosity issues, thermal techniques, such as steam, are often employed to promote mobilization of the oil and hence flow, however the oil wet nature of carbonates still prevents free release of the oil thereby limiting possible recovery factors. Mobilization of the oil is important to developing sufficient injectivity in the case of an EOR flooding technique. Although application of heat via steam can make the matrix more water wet through a remineralization process, it tends to be slow since calcite and dolomite solubility are reduced at higher temperatures. Many of these crudes may be classified as "dead" crudes in that there is little, if any, dissolved gas associated with them to provide natural energy to assist with the recovery efforts, particularly during and after primary production.

Oil Recovery Challenges in Carbonate Formations

When primary and secondary production methods have been exhausted, or when the formation is such to preclude primary production, in some reservoirs enhanced oil recovery (EOR) methods can be used to recover additional oil. Carbonate matrix formations are formed by fractured and karsted dolomitic rocks. Carbonate reservoirs composed of calcite and dolomite offer a unique challenge to enhanced oil recovery because they often display oil wet to mixed wet characteristics. "Wettability" describes the preference of a solid to be in contact with one fluid rather than another and affects relative permeability, saturation profiles, water flooding, aquifer encroachment into a reservoir, and other properties of the formation. "Water wet" formations prefer to be in contact with water (compared to oil), while "oil wet" formations prefer to be in contact with oil (compared to water). Water wet surfaces have an adhesive attraction of the water greater than the cohesive attraction of the water molecules for one another. Oil wet surfaces have an adhesive attraction of the oil greater than the cohesive attraction of the oil molecules for one another. Wettability can be quantified by the contact angle that the liquid makes with the contacting surface. For example, if water is used as a drive fluid, it displaces oil at the solid surface in a water wet system but advances over the oil in an oil wet system. "Mixed wetting" describes materials that have inhomogeneous wetting, which is a variety of wetting preferences. "Mixed wetting" (having a variety of wetting preferences) is different than "neutral wetting" (lacking a strong wetting preference).

Oil wet to mixed wettability in carbonate formations is a result of the chemistry that has occurred over geologic time making the heavy oil/bitumen difficult to release from the surfaces. Reservoirs are complex structures, often comprising a variety of mineral types. Each mineral can have a different wettability preference, making the overall wetting character of the composite rock difficult to describe and difficult to plan effective oil recovery operations around. Many carbonate reservoirs are naturally fractured geologic formations with overall low porosity but a heterogeneous distribution of permeability. High permeability of the fractures and low pore volume in the fracture network leads to early breakthrough of injected fluids in the producing wells and less than optimal hydrocarbon recovery from these formations. As a result, very few EOR methods work effectively for fractured oil-wet carbonates.

This is particularly the case in the heavy oil carbonate fields of Canada that have a moderate to high acid content. Certain acidic components of these crude oils, such as naphthenic acids, react with the calcium or magnesium from the carbonate reservoirs to create the naphthenate salt form of the acid, which has low solubility in water. These naphthenate salt forms are like the well-known insoluble soap scums that form from detergents in hard water. The insoluble oil phase salts then provide potential oil attachment points to the carbonate surface making the carbonate preferentially oil wet (oil-preferring). On the other hand, the sodium or potassium naphthenate salts act as surfactants to help reduce interfacial tension (IFT) and to release oil from the surface. These soluble forms are a natural consequence of alkaline flooding and promote a water wet (water-preferring) surface.

Wettability Alteration in Carbonates

Various alkalis such as silicates have been shown to alter wettability to a more water-wet state at low temperatures, but most suffer from very high consumption rates at elevated temperatures where the alkaline chemical slugs become quickly spent before propagating deep into a carbonate formation. The consumption is the result of alkali precipitation reactions with the hardness ions ($Ca^{2+}$, $Mg^{2+}$, etc.) generated by the limestone/chalk minerals in the reservoir/formation.

High temperatures (from steam or hot water flooding, for example) can alter wettability from oil wet to more water wet as Mg, Ca, $CO_3$, or $SO_4$ containing minerals tend to dissolve and re-deposit as fresh surfaces depending on chemical equilibria which vary as a function of temperature. Wettability is then controlled by spreading forces and adhesion forces on these new surfaces. However, there is often a prolonged incubation time associated with this process before water wet conditions are actually achieved.

Other wettability altering methods have been attempted such as injecting carbon dioxide, sulfur dioxide and/or nitrogen dioxide, to form acidic liquids or vapors to dissolve minerals and alter equilibria. When combined with water or steam and injected during in-situ recovery operations, the acidic liquids/vapors alter wettability from oil to water wet. Other methods use a stepped salinity gradient or dilute surfactants to alter wettability so more oil is released.

Other techniques have been proposed and attempted for improving the oil recovery efficiency from oil-bearing carbonate formations, but still large volumes of hydrocarbons remain in oil-rich formations after secondary and tertiary recovery efforts. Numerous enhanced oil recovery technologies are currently practiced in the field including those involving thermodynamic, chemical, and mechanical displacement processes. Heating the oil with steam often reduces the viscosity of the trapped oil, provided there is ready access to steam energy and heat losses can be managed. Miscible chemicals, such as $CO_2$ and hydrocarbon solvents also swell the oil phase to reduce viscosity but are most often used for lighter crude oils. Other chemical systems employing alkalis, surfactants, and/or polymers are less widely used often due to cost and high consumption issues.

Even with these oil recovery techniques, oil recovery from carbonate formations and reservoirs has not reached its potential. Improved methods are required to access and mobilize more of the trapped crude oil in these heavy deposits so that it can be added to the recoverable reserves. Prior systems and methods for increasing the productivity of oil wells have fallen short. A continued need exists in the art for effective oil recovery from carbonate formations and reservoirs.

SUMMARY

The claimed invention transforms carbonates within an oil-bearing carbonate formation to alter the wettability characteristics of the carbonate reservoir, such as surface wettability. Altering the wettability characteristics, making the reservoir more water wet, allows the oil to flow more freely toward a production well.

Alkali metal silicides are used in a method of the claimed invention to alter wettability characteristics of a carbonate formation to stimulate oil production. One example method includes selecting an oil bearing carbonate formation, injecting a silicide dispersion into the carbonate formation and reacting the injected silicide dispersion to alter the wettability characteristics of the carbonate formation. Alkali metal silicides, such as disclosed in US published application no. 2014/0196,896 A1 (which is incorporated herein by reference in its entirety), have properties that leverage the benefits of chemical, immiscible gas, and thermal flooding techniques and allow them to be used as enhanced oil recovery (EOR) agents.

DETAILED DESCRIPTION

The invention relates to methods of altering a wettability characteristic of a carbonate formation to stimulate oil production. The method selects an oil-bearing carbonate formation; injects a silicide dispersion into the carbonate formation; and reacting the injected silicide dispersion to alter the wettability characteristic of the carbonate formation. The reaction forms silicon-calcium adducts within the formation which are more water wet than the carbonates in the carbonate formation prior to the reaction.

The invention utilizes an alkali metal silicide (such as disclosed in U.S. Pat. No. 7,811,541, which is hereby incorporated by reference in its entirety) that rapidly produces significant amounts of heat, hydrogen gas, and an alkali metal silicate solution upon contact with water. The combination of reaction products provides great flexibility for the enhancement of crude oil recovery processes. Example embodiments of the claimed invention utilize alkali metal silicides of the alkali metal group consisting of lithium (Li), sodium (Na) and potassium (K). For example, several example compositions including lithium alkali metal silicide ($Li_{12}Si_7$), sodium silicide ($Na_4Si_4$), and potassium silicide ($K_4Si_4$) can be utilized in methods of the invention. Upon reaction with water, an alkali metal silicide produces an alkali metal silicate, hydrogen gas, and heat. Although the remainder of the discussion focuses on systems and methods of the sodium forms of the alkali metal silicide composition as illustrative examples, other alkali metal versions of alkali metal silicide (as well as other metal versions silicides) can also be used effectively in the invention with oil-bearing carbonate formation field applications and are included in the scope of the claimed invention. Mixtures of alkali metal silicides may be used as the alkali metal silicide in the invention. Included within such mixtures are combinations of alkali metal silicides as well as mixed metal alkali metal silicides. That is, the alkali metal in the alkali metal silicide can be an individual metal (e.g., Ca, Na, K) or the metal can be a combination of alkali metals (e.g., Ca and Na; Na and K; Ca, Na, and K)—a mixed metal alkali metal silicide. Mixtures of all such alkali metal silicides can be used.

Alkali metal silicides of the claimed invention are used in a method of treating hydrocarbon reserves by altering surface wettability of carbonate reservoirs for improved recovery of heavy oil or bitumen in carbonate wells and reservoirs. The alkali metal silicides of the claimed invention are used to control channeling of fluids in carbonate reservoirs and to change the carbonate rock wettability. Example methods of the claimed invention can be applied to oil wet reservoir matrices and to water wet hydrocarbon deposits to improve recovery of residual bitumen and to mobilize, or assist in mobilizing, heavy hydrocarbons.

Alkali metal silicides can be used at any depth within an oil-bearing carbonate formation since the only limiting factor is the availability of water, or any reacting fluid. When delivered downhole either as time-delayed water-resistant coated solid or via a hydrocarbon carrier fluid dispersion, the reaction is generated in the formation at the point of reaction upon contact with formation, or co-injected, water and in proximity to the carbonate surfaces making up the formation. In addition to modifying the wettability of a carbonate formation, the alkali silicide reaction products generated at the reaction point generate pressure, generate heat, and create surfactants to alter surface wettability and also lower interfacial tension (IFT) of the oil formation before they are consumed. All these reaction products contribute to altering carbonate wettability and promote oil recovery from the carbonate formation.

Alkali metal silicides in accordance with the claimed invention include the silicides of sodium (Na), potassium (K) and lithium (Li). These materials can be produced as free-flowing granules or as powders that are stable and easily handled in dry air. Alkali metal silicides do not react directly with oxygen and do not ignite, but will react with water from the atmosphere. As illustrated by the following chemical equation [1] for a sodium version ($Na_4Si_4$), alkali metal silicides react with water to produce hydrogen gas, a corresponding alkali metal silicate ($Na_2Si_2O_5$), and significant heat.

$$Na_4Si_4(s)+10H_2O(l) \rightarrow 10H_2(g)+2Na_2Si_2O_5(s)+1,654 \text{ kJ} \quad [1]$$

In one embodiment for use in a method of the invention, an alkali metal silicide in oil dispersion is prepared in diesel oil with a maximum particle size of about 20 to 25 microns. A large fraction of the particles are submicron. To prepare this dispersion, sodium silicide, $Na_4Si_4$, ingots were dry crushed and then wet milled to achieve the final particle size dispersion using grinding techniques known in the art. This dispersion may then be further diluted with additional diesel and either a non-ionic surfactant or viscosity modifier to reduce settling tendency and aid in re-dispersion. Non-ionic surfactants and viscosity modifiers known in the art may be used but should be compatible with the alkali metal silicide. Other factors known in the art for selecting a particular non-ionic surfactant or viscosity modifier include solubility in the dispersant, melting point, HLB value, etc. The material is then ready for injection downhole.

When used as an agent to alter wettability in an oil-bearing carbonate formation, the alkali metal silicide is introduced directly to the well, where it reacts when it comes into contact with water in the reservoir vugs, fractures, and pore spaces of a carbonate formation. During the reaction, the silicide rapidly releases hydrogen gas and heat and ultimately converts to an alkali silicate. It is this combination of reaction products that makes silicides particularly beneficial when used either directly, or in combination with other conventional techniques, for heavy crude recovery from an oil-bearing carbonate reservoir.

The silicide reaction proceeds rapidly at any temperature or pressure and does not require a catalyst. The heat and hydrogen that is produced provide the energy and pressure required to effectively displace heavier crudes as well as play a role in the wettability alteration. Reactivity studies have shown that silicide generates the highest amount of hydrogen on a molar basis and has the fastest reaction rate compared to other hydrogen producing chemistries such as sodium metal in water, aluminum metal in caustic (alkaline), or silicon metal in caustic (alkaline), releasing hydrogen at a rate up to 1.49 L/min/cm$^2$. The reaction rate is a function of the surface area of the silicide that is in contact with water, so fine powders with higher surface areas react fastest.

In one embodiment of the claimed invention, a sodium silicide may be used as the form of alkali metal silicide. A sodium silicide is used in the examples in this disclosure, although other alkali metal silicides can be used and will also perform well. For instance, the potassium alkali metal silicide can be considered where swelling clays in the smectite group, such as montmorillonite and illite, are present in the oil formation. The sodium ion tends to swell these clays, whereas the potassium ion has lesser tendency to swell and can thereby better maintain reservoir permeability and injectivity/productivity. The selection of the particular alkali metal silicide can be determined based on cost, application, environmental concerns, and the like.

Impact of Alkali Silicate

One by-product of the silicide reaction is the corresponding alkali metal silicate produced. The silicate enhances oil recovery by changing the wettability (the preference to contact one liquid or gas rather than another), and help control mobility within the oil formation. Silicide that is converted to silicate provides sufficient alkalinity to saponify crude oil acids (generally >10.5 pH), while also remineralizing carbonate surfaces within the reservoir. The silicate may also react with the crude oil's natural acids to produce sodium salt forms of surfactants, which lower interfacial tension (IFT) of the oil. The generated surfactants reduce interfacial tension (IFT) at the oil/water interface to allow crude oil droplets to more easily deform and flow through tight pore channels toward a production well. A typical 1% 2.0 ratio sodium silicate solution has a pH value of approximately 11.8 and has sufficient alkalinity to create in situ surfactants.

Silicates produced from the silicide reaction, unlike other chemicals commonly used in EOR such as sodium hydroxide, sodium orthosilicate, sodium carbonate, and the like, also provide a degree of profile modification, sweep improvement, and favorable wettability characteristics, all of which contribute to the effective release of crude oil from the carbonate and sand surfaces and displacement toward a collection point. Silicates represent a spectrum of compounds ranging from very alkaline to very siliceous. The silicate that forms from silicide is intermediate in molar ratio of silica to alkali. Generally, lower ratio, more alkaline silicates such as orthosilicate ($Na_4SiO_4$) have been used for alkaline flooding applications, while higher ratio, less alkaline silicates ($Na_2O:3.3SiO_2$) have been used for profile control and gel blocking applications. Typically, less alkaline silicates at concentrations of 3 to 10%, when mixed with an acid to reduce pH to less than 10, form a strong gel network that can block flow channels. Likewise, if there is significant hardness or multivalent cations present in the formation brine or intentionally injected, as in Mobility Controlled Caustic Flooding, silicates react with these ions to form precipitates, which can accumulate at pore throats to block flow channels at lower concentrations and lead to more gradual conformance control and diversion of fluids to reduce fingering. These reactions can lead to gradual profile modification and reduced viscous fingering in heavy crude oil reservoirs and provide improved recovery. The particular silicate by-product resulting from silicide is intermediate in molar ratio of silica to alkali so it provides sufficient alkalinity for reaction with crude acids while also providing a degree of flow diversion and sweep improvement through profile control.

In the practice of a method of the invention, the silicide reaction, the reaction itself and the silicate produced alters the surface wettability characteristic of the carbonate formation causing the formation to more water wet (less oil wet) than it was prior to the reaction. High temperature wettability is also improved as steam injection does not diminish the altered wettability characteristics of the oil-bearing carbonate formation. The improved water wet characteristics under high temperature reservoir conditions greatly improve the oil recovery from these formations by allowing the oil to more readily release and flow.

Impact of Hydrogen

The hydrogen that evolves from the silicide reaction is a non-toxic gas that has slightly less heating value than natural gas. It can be burned in the field as a fuel source or flared. In a carbonate matrix formation, hydrogen is minimally soluble (~25× less soluble than $CO_2$ as per Ostwald coefficients) in crude oil but does contribute to viscosity reduction and surface alteration. As an example, $H_2$ solubility in an Athabasca vacuum bottom was measured at between 0.021 moles $H_2$/kg liquid/MPa at 130° C. to 0.034 moles $H_2$/kg liquid/MPa at 186° C. In water, hydrogen solubility as a function of temperature and pressure is also low, and has a value of 0.0016 g $H_2$/kg water at 20° C. and 1 atm. As a result, the bulk of the hydrogen generated in the systems and methods of the claimed invention remain as an immiscible gas phase that magnifies the original injected volume and provides drive energy for displacement of fluids and can be used to reduce the carbonate surface to prepare it for reaction with the silicate by-product of the alkali metal silicide reaction along with other chemicals added to the formation to aid in wettability alteration. The rapid generation of hydrogen, along with the in situ generation of silicates, creates an optimized environment to alter the carbonate surface properties to transform it towards more water wet allowing for the production and flow of crude toward a collection point.

Silicide has been observed to generate hydrogen pressure in confined spaces in excess of 10,000 psi, so the reaction rate is limited only by the availability of water. Since 1 mole of silicide generates 10 moles of hydrogen gas, a relatively small, but concentrated, slug of injected silicide can create a significant volume of gas to provide energy and pressure.

Impact of Heat

The silicide reaction also generates significant heat, which increases the degree of surface modification and lowers oil viscosity. Crude oil viscosity decreases in a nearly logarithmic manner as a function of temperature and depends on API gravity and other factors. This is why steam flooding and other thermal techniques are often effective. While steam application for recovery of low grade heavy oils generally involves the combustion of natural gas or other high value hydrocarbons to generate steam, which contributes to greenhouse gas emissions, the heat and hydrogen generated by the alkali metal silicide reactions of the claimed invention do not require combustion and do not contribute to greenhouse gas emissions. The alkali metal silicide reactions of the claimed invention involve much more environmentally-friendly methods for generating heat downhole. Steam techniques are limited by reservoir depth and pressure as a result of the lack of phase boundaries beyond the critical point of water. As a result, steam techniques are often limited to depths less than 5,000 ft. Additionally, while steam flooding also is generally reserved for relatively thick formations greater than 50 ft. to minimize heat losses to cap and underlying rock formations, the methods of the claimed invention can be used on carbonite formations of any thickness.

Although the amount of heat available from the silicide reaction (at exemplary application rates) is much smaller than would be required in a typical steam flood, the heat is generated in situ so there are no losses at the surface or to the well string in transit to the oil formation. All of the heat from the silicide is released at the reaction sites inside the carbonate formation vugs, fractures, and pores upon contact with water, alcohol, or acid. While the heat may be insufficient to reduce viscosity to the point where trapped oil flows freely, it is sufficient combined with the alkali silicate released to begin the remineralization of carbonate surfaces to effect wettability changes. Subsequent application of either additional heat from thermal processes or solvents, or both, can then more effectively alter carbonate surfaces within the reservoir and mobilize the trapped oil once it releases from the carbonate surfaces. If additional heat is required, the heat effects can be magnified by nearly a factor of three (3) times when oxygen is co-injected and the hydrogen is allowed to auto ignite and burn.

Additionally, some crude oil beneficiation via hydrogenation/cracking reactions can occur as a result of the hydrogen and heat that was generated. Hydrocracking occurs at temperatures of 500 to 800° F. (260 to 425° C.) and pressures of 800 to 2,500 psi or higher. This additional mechanism further lowers the heavy crude viscosity and can be evaluated in the context of what occurs at the micro-scale where these conditions can be briefly achieved within a confined pore space in the presence of clay minerals acting as natural catalysts.

Silicide Delivery Methods in Carbonate Formations

Altering the wettability of surfaces within an oil-bearing carbonate formation to increase water wettability (as well as combination of chemical, thermal, and immiscible gas mechanisms provided) allows alkali metal silicides according to the invention to efficiently recover a variety of crude oils (moderate to very heavy, API gravity 22 down to 10) from carbonate formations. The heavier, more viscous crude oils tend to have a high natural acid content (Total Acid Number (TAN) value) which benefit the most from the application of heat and alkali. Application of the silicide techniques in accordance with the invention is beneficial in these situations as the silicide is injected into the oil bearing carbonate formations where it reacts with water, an alcohol or an acid to alter the surface wettability of a hydrocarbon deposit toward water wet. After injecting alkali metal silicide into an oil-bearing carbonate formation, the alkali metal silicide may be reacted with in situ water present in the formation, or with injected water, alcohol or acid. The injected water, alcohol or acid may be supplied from the same, or a different, well as the injected alkali metal silicide.

Silicide is a solid with density of 1.7 g/cc and a Mohs hardness of approximately 3.5. Therefore, to inject and deliver the silicide into a reservoir formation, it is reduced in size to where it can effectively penetrate a porous media. An alkali metal silicide may be injected into an oil-bearing carbonate formation as a coated powder or slurried in a carrier fluid. Such alkali metal compositions are described in US published patent application no. 2014/0196896 A1 (incorporated by reference in its entirety). In one embodiment, the alkali metal silicide injected in accordance with the invention is dispersed and/or suspended in an appropriate non-aqueous medium to form an alkali metal silicide dispersion. Silicides can be readily wet or dry milled to submicron size via mechanical means. Many inexpensive hydrocarbons can be used for the carrier fluid, including mineral oil, kerosene, diesel, and naphtha. These light hydrocarbon carrier fluids are preferred since they also serve as a diluent for the heavy crudes and bitumens to reduce viscosity and promote flow. A medium to light native crude oil can also be used to reduce cost after it has been dewatered. Suitable dispersions of up to 80% solids have been prepared in paraffinic mineral oil, kerosene, diesel oil, and a light crude oil. Some short-chain alcohols are not acceptable since the —OH end group can be cleaved by the silicide similarly to water, although at a reduced rate compared to water. For stability and suspension purposes, a small amount of a non-ionic surfactant or hydrocarbon soluble polymer can be added to the formulated dispersion to reduce settling tendency and to facilitate re-dispersion. Also, thickeners, such as fumed silica among others, can be added to increase formulation viscosity to retard settling. Such additives can then contribute to inter-facial tension (IFT) reduction and mobility improvements in the formation.

In a carbonate reservoir environment, higher permeability formations (>1 Darcy) may be encountered, such as unconsolidated or fractured carbonate formations with high permeability vugs (cavities) and channels. This allows for the injection of a solid dispersion without appreciable face plugging. Formations of less than a Darcy can form surface blockage at the well interface as solid material bridges the pores and deposits causing injectivity to be lost over time. The natural channels and vugs of highly fractured carbonate formations provide an ideal path for injection of silicide dispersion deep into the formation to alter the wettability of the formation and do not require a tight range of particle sizes. The only limitation on the amount of alkali metal silicide in dispersion is the dispersion's ability to be injected into an oil-bearing carbonate formation. Generally speaking alkali metal silicide dispersions having loadings from about 15 to about 80 wt. % may be used. In other embodiments, 20-50 wt. % dispersions or dispersions of 25 wt. %, 30 wt. %, 35 wt. % or 40 wt. % may be used.

Silicide Reaction Process & Oil Recovery

While wettability alteration is not necessarily needed deep in the formation, to maximize oil recovery, in some example embodiments of the claimed invention the bulk of the silicide reaction can optionally be delayed to occur deep within the producing formation, where it comes into proximity with, or intimate contact with, carbonate surfaces, water, and the resident crude oil. To affect a deeper delivery of the silicide, a silicide injection slug can include a silicide dispersion in a hydrocarbon carrier fluid and/or can be coated with a wax or polymer to delay the reaction start. The silicide injection slug influences the development and flow of the oil bank as the slug reacts with water, an acid, or an alcohol in the well and with the carbonate formation itself.

Silicide can be delivered to the carbonate formation or reservoir in several ways. It can be injected in a flooding mode with dedicated injection wells and production wells where the silicide contacts the carbonate formation, reaction fluid, and oil in the reservoir matrix and in channels, vugs, fractures, or other cavities, if present. Likewise, silicide can also be injected in a cyclic manner into producing wells with injection, soak, and production periods, where the silicide contacts water (and/or acid or alcohol) and oil and carbonate formation either in the reservoir matrix, in channels, vugs, fractures, or other cavities.

One method of the claimed invention includes injecting additional reaction fluid into the wellbore and reacting the injected alkali metal with the injected fluid in the oil-bearing carbonate formation. Additionally, reacting the injected alkali metal silicide to stimulate oil flow within the oil-bearing carbonate formation can be done in combination with at least one separate step of steam injection, solvent injection, thermal heating of the oil bearing formation, or chemical treatment of the oil-bearing carbonate formation.

Figure 1:
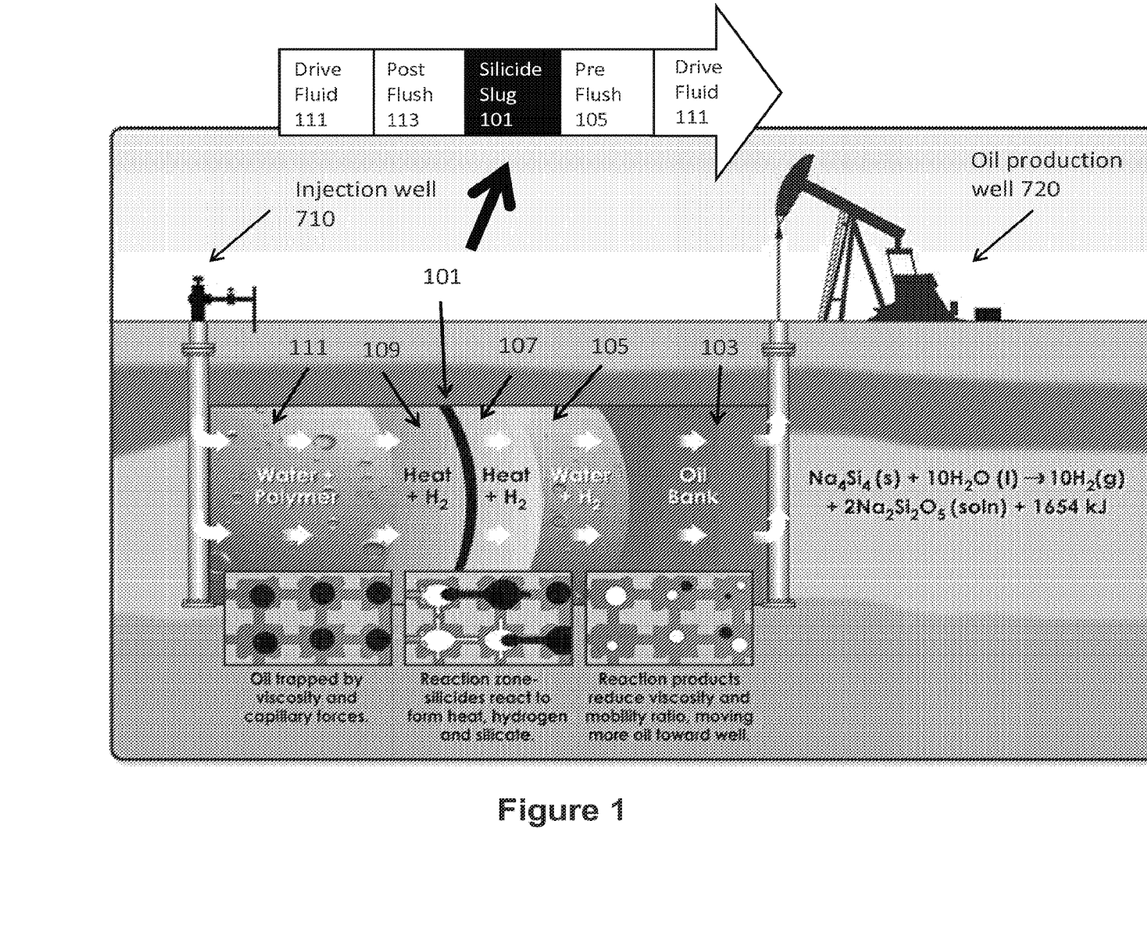
FIG. 1 is a schematic diagram for an exemplary silicide flooding sequence.
Figure 7:
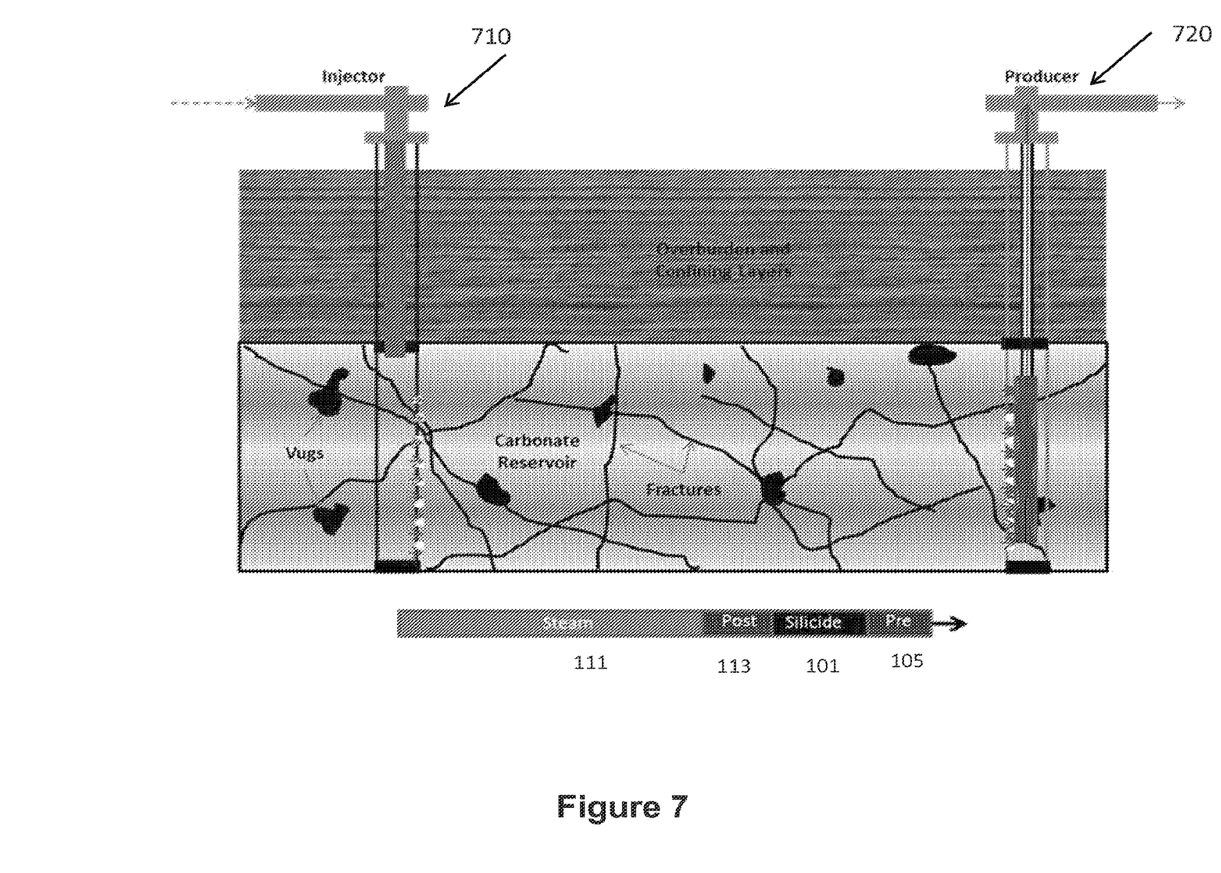
FIG. 7 shows an example silicide injection methodology similar to FIG. 1 with a carbonate formation highlighted.

FIG. 1 shows a schematic example of the claimed method of silicide introduction in a flooding mode and how the reaction functions in the reservoir. The silicide injection can be employed with injection and production from separate wells as shown in FIG. 1. FIG. 7 also shows an example silicide injection methodology similar to FIG. 1 with a carbonate formation highlighted. Such wells could be vertical, such as those shown in FIGS. 1 and 7, or horizontal (not shown separately). As shown in FIGS. 1 and 7, water may be present in the wellbore and in the immediate vicinity of the target crude oil bank 103 (as a result of formation water saturation, previous water or steam injection, or other operations). A preflush of light hydrocarbon can be used to displace as much of this resident water as possible. For example, a short 1 to 3% PV slug of a hydrocarbon preflush can be injected. Often, a pure hydrocarbon preflush is performed. See reference numeral 105, for example, where the hydrocarbon pushes water and the oil bank 103 toward the production well. This preflushing serves to "dry" the delivery path in advance of the silicide injection slug 101. For heavier crude oils, this preflush 105 also serves as a suitable solvent, or diluent, to further improve mobility. The preflush is followed by a short 3% to 5% PV slug of the submicron silicide dispersion in a hydrocarbon carrier fluid at 20 to 40% by weight (silicide injection slug 101). Similarly, on the back end of the silicide slug 101, a short postflush slug 113 of hydrocarbon (such as a 1 to 3% PV slug of hydrocarbon) can be used to clear the wellbore of silicide dispersion (in silicide injection slug 101) and to isolate it as much as possible from any aqueous-based drive fluids that follow, such as steam, and/or solvent gases 111. As was the case with the preflush, the postflush slug can also be pure hydrocarbon. In this way, as the silicide slug 101 advances into the formation, there will be reaction both at the front 107 and at the rear 109 of the silicide slug as natural dispersion within the porous matrix creates the opportunity for contact with water. The hydrocarbon postflush 113 provides additional benefits because a fast reaction on the back end can rapidly propel the unreacted silicide slug 101 ahead and accelerate its contact with water 105 on the front end, allowing it to rapidly expend itself in a shorter period of time with a consequent pressure and temperature spike. The design of the hydrocarbon pre and postflush slugs is important for delaying the bulk of the silicide reaction and release of silicates to affect the maximum amount of carbonate surfaces in the formation. Multiple silicide slugs may be injected alternating with steam and/or solvents to replenish and continue the water wet favorable conditions. Swabbing operations to remove standing water from the wellbore may be used as an alternative to, or in conjunction with, a hydrocarbon flush.

The silicide dispersion is injected into the carbonate formation well at a selected injection pressure and a selected injection temperature. The selected injection temperature will be at or about the same as the reservoir temperature (about 15° C., for example, which is typical for western Canada oil fields). The selected injection pressure should be greater than the reservoir pressure and should be sufficient to cause the silicide to flow into the reservoir and to fill porous matrices, fractures, vugs, and cavities and possibly cause other fracture structures within reservoir formation.

Extending High Temperature Wettability Improvement in Carbonate Reservoirs

Silicide application is not limited to just high permeability oil-bearing carbonate formations. It can also be applied to carbonate formations where the natural faulting fractures and vugs provide high permeability pathways for the silicide dispersion to penetrate the formation and to stimulate heavy crude production. Many such carbonate reservoirs are considered oil wet, or at best mixed wet, both of which make it difficult for effective release and recovery of the resource. Recent tests have shown that the silicate, hydrogen and heat that is generated in situ when the silicide dispersion reacts with water makes carbonate materials more water wet, which allows the oil to release and flow more freely. Not to be bound by theory, but reaction of an alkali metal silicide within an oil-bearing carbonate formation according the invention, alters the wettability characteristic of the formation by heat-on-surface effects and/or akali-on-surface effects.

Figure 2:
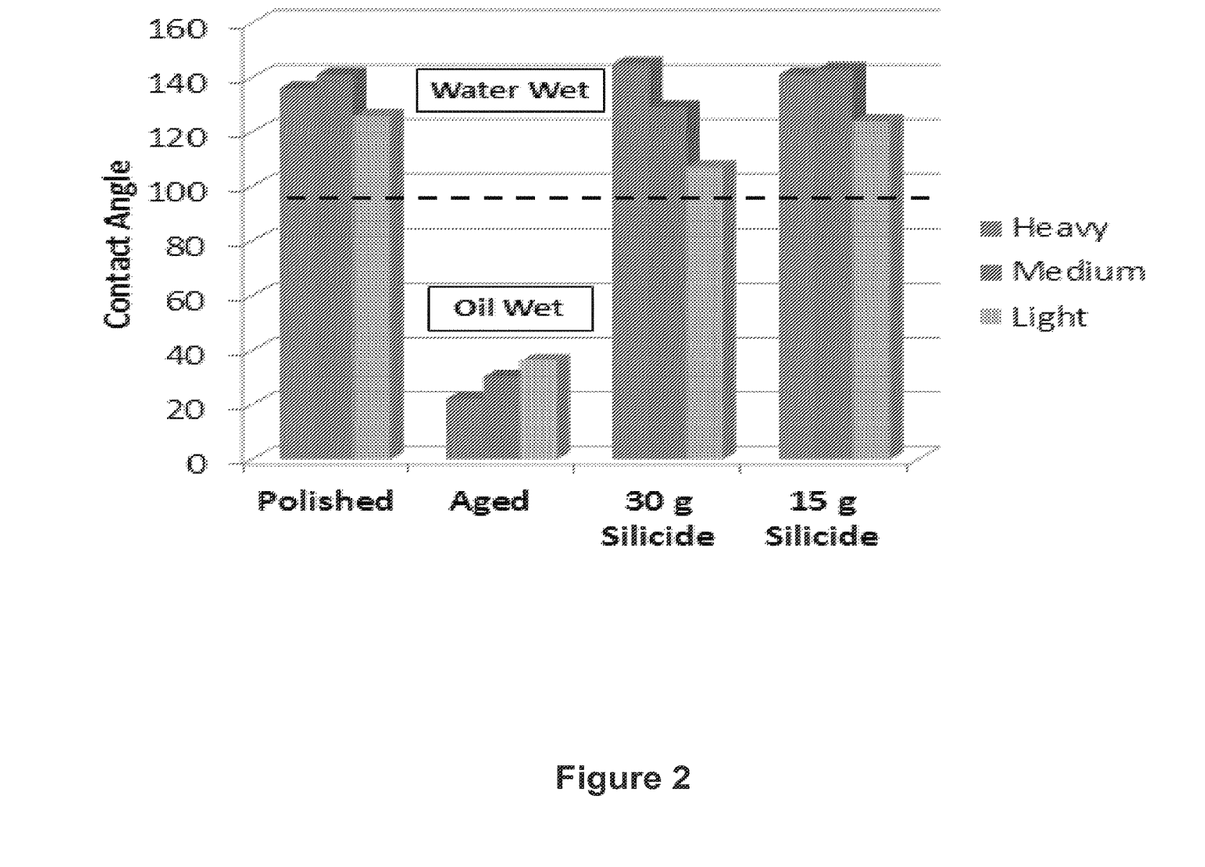
FIG. 2 shows results of contact angle measurements on carbonate reservoir core plugs with three different crude oils both initially and after applying silicide at different rates.
Figure 9A:
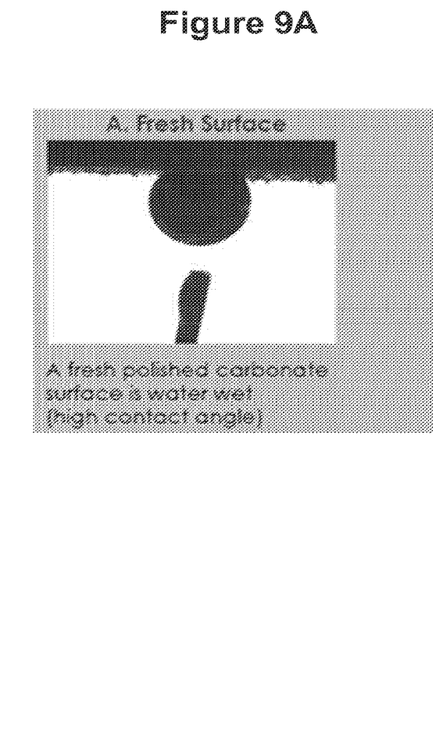
FIG. 9A illustrates a fresh polished carbonate surface that is water wet.

To confirm the reaction observations, carbonate reservoir core plugs were cleaned of oil and polished on one side. Next, the contact angles with oil were measured as a baseline, as shown in FIG. 2. Initially, all were strongly water wet as expected and shown in FIG. 9A, fresh surface. The individual carbonate plugs were then aged in three different crude oil samples representing a light, medium and heavy crude oil for two weeks at 65° C. to allow them to become naturally oil wetted. The oil properties (density, viscosity, and total acid number) for the different oil types are listed in Table 1 below.

TABLE 1

| Oil Type | Density, kg/m³ | Viscosity, mPa · s (@15° C.) | TAN, mg KOH/g |
|---|---|---|---|
| Light | 820 | 3 | 0.40 |
| Medium | 940 | 380 | 0.575 |
| Heavy | 980 | 20,000 | 0.902 |

Figure 9B:
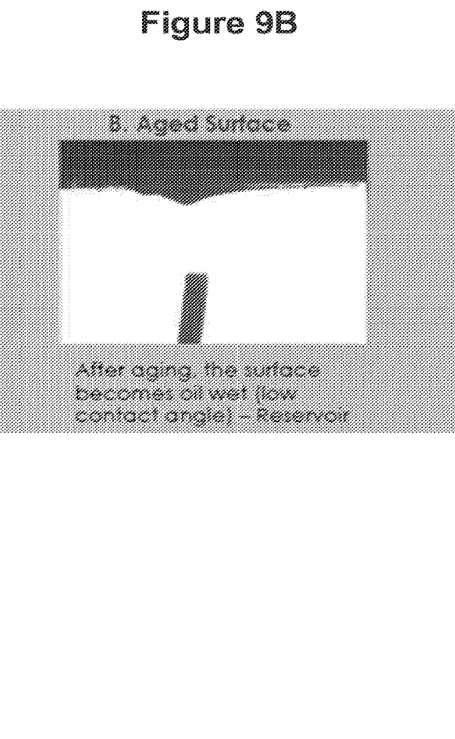
FIG. 9B shows an aged carbonate surface that becomes oil wet.
Figure 9C:
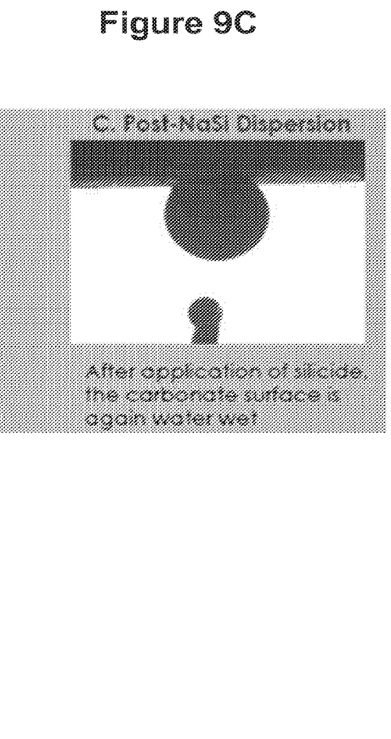
FIG. 9C shows a carbonate surface after application of sodium silicide when the carbonate surface is again water wet.

Samples were removed from the oil aging process and washed with toluene to remove excess oil, which does not alter wettability. Contact angles with oil were re-measured. This aging process resulted in all plugs becoming strongly oil wet regardless of the oil gravity and acid value as seen in FIG. 9B, aged surface. Two silicide application rates, 15 g and 30 g, were tested using a 30% by weight silicide in mineral oil dispersion. Synthetic sea water with pH value of 7.82 and TDS of 38,500 mg/L was used as the aqueous phase. This is representative of a typical carbonate reservoir native brine. The quantity of 30 g silicide dispersion reacting with water was sufficient to raise the 90 g of synthetic sea water, plug, and autoclave vessel to about 70° C. by itself, but was further externally heated to 200° C. as more representative of potential field conditions (particularly if silicide is applied in conjuction with a thermal process such as steam) that can be achieved for the test without the autoclave vessel acting as a significant heat sink. The autoclave was held at 200° C. for five hours before being allowed to slowly cool naturally. The pressure increase due to hydrogen evolution was approximately 200 psig, but further increased to over 400 psig as a result of the external heating. Once the plugs were removed from the autoclave, the contact angles were re-measured. The contact angle results are shown in FIG. 2 showing that all plugs are once again water wetted after application of the silicide dispersion, as also shown in FIG. 9C, post-NaSi dispersion.

Figure 8A:
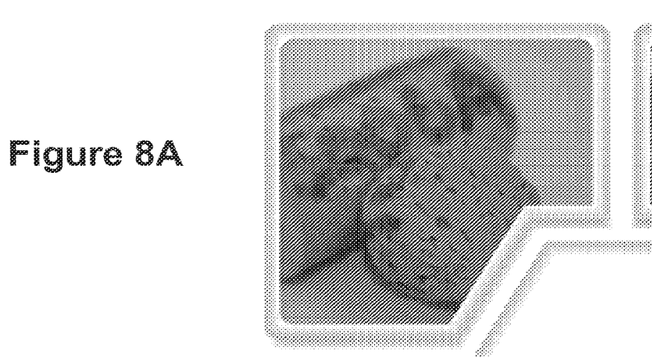
FIG. 8A shows a polished carbonate core sample.
Figure 8B:
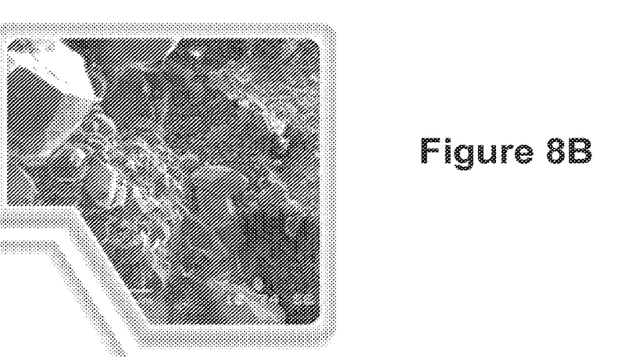
FIG. 8B shows an SEM depicting a magnified carbonate surface.
Figure 8C:
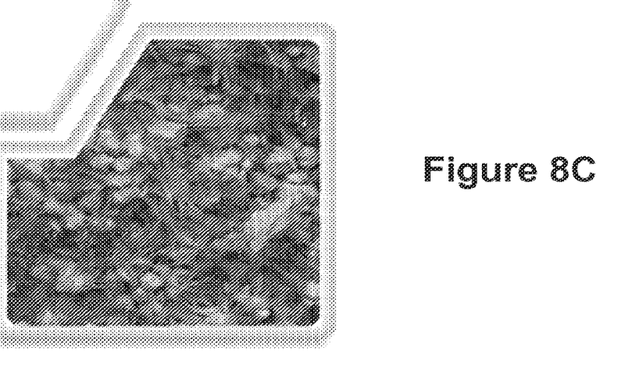
FIG. 8C shows a SEM of carbonate remineralization after a silicide treatment in accordance with the invention.
Figure 8D:
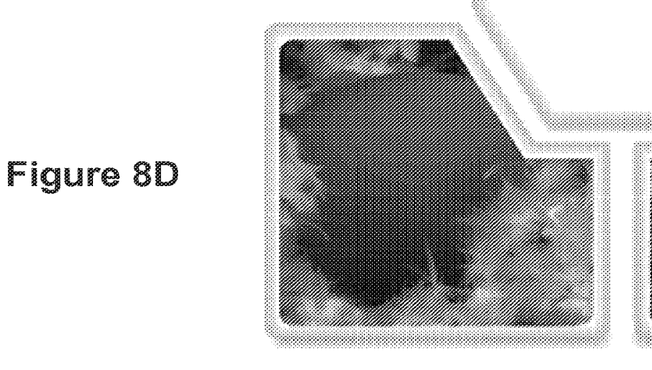
FIG. 8D shows an oil droplet on the remineralized calcium-silicon water wet surface.

This high temperature wettabililty alteration phenomenon is attributed to a rapid remineralization of the carbonate surfaces resulting from the silicate and heat by-products from the silicide reaction as a new calcium-silicon adduct phase. FIG. 8A shows a polished carbonate core sample. FIG. 8B shows an SEM depicting a magnified carbonate surface. FIG. 8C shows a SEM of carbonate remineralization after a silicide treatment in accordance with the invention. FIG. 8D shows an oil droplet on the remineralized calcium-silicon water wet surface.

Comparison of Polished Carbonate Cores After Treatments

Figure 3:
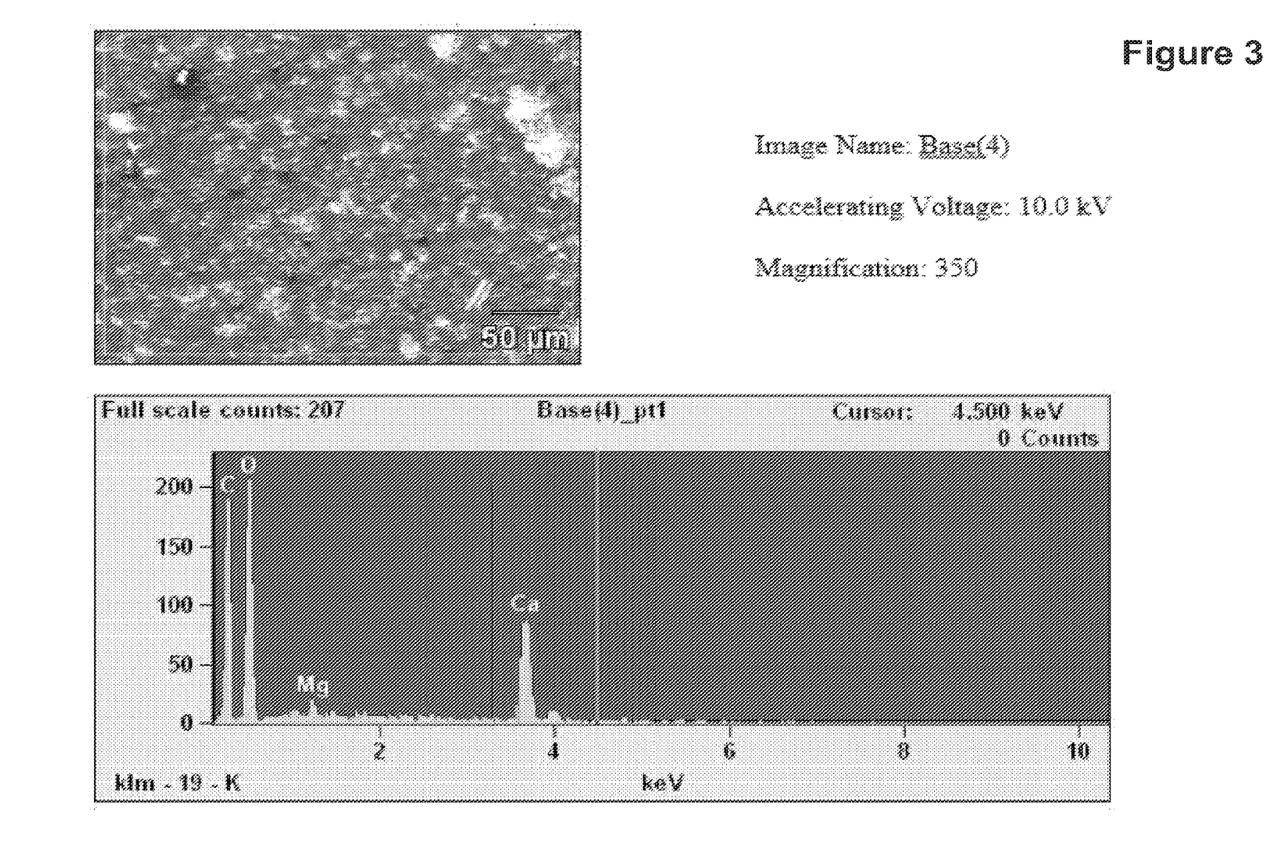
FIG. 3 shows a Scanning Electron Microscope (SEM) image and Energy Dispersive X-Ray Spectroscopy (EDS) scan of a polished carbonate core before any treatment.

FIG. 3 shows a Scanning Electron Microscope (SEM) image and Energy Dispersive X-Ray Spectroscopy (EDS) scan of the polished carbonate core before any treatment. FIG. 3 shows the surface to be calcium carbonate with a trace of magnesium as would be expected for a limestone.

Figure 4:
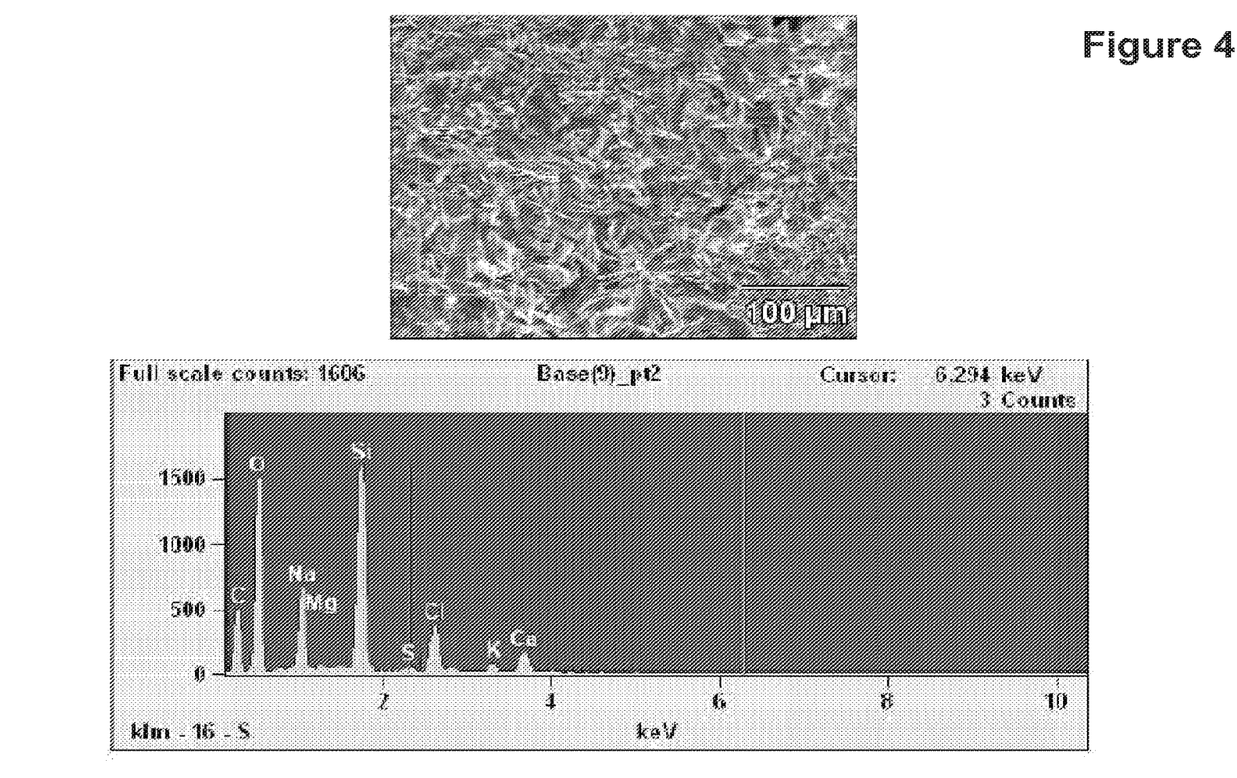
FIG. 4 shows the image and scan of a heavy oil aged core plug after treatment with 15 g of silicide dispersion for 5 hours at 200° C.

FIG. 4 shows the image and scan of the heavy oil aged core plug after treatment with 15 g of silicide dispersion for 5 hours at 200° C. This figure shows a re-mineralized surface that now contains the calcium-silicon rich (as seen by the high ratio of silicon to calcium) pectolite phase with some trace amounts of potassium and magnesium. Pectolite is typically found in the vicinity of hydrothermal vents and exhibits these book-like plate or needle shape characteristics. This remineralization results in crystallization that saturates the surface with plate-like structures that are hydrophilic in nature, thereby making the surface water wet.

Figure 5:
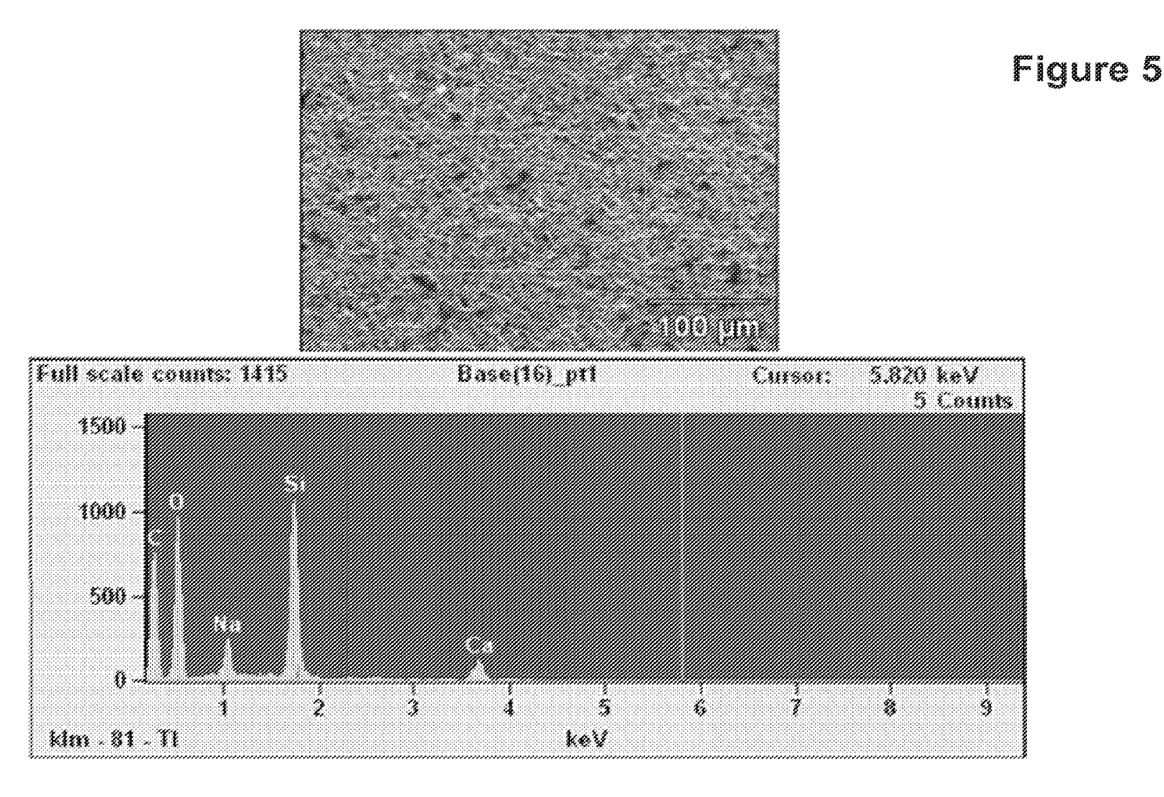
FIG. 5 shows the image and scan of a heavy oil aged core plug after treatment with the higher level of 30 g of silicide dispersion for 5 hours at 200° C.

FIG. 5 shows the image and scan of a heavy oil aged core plug after treatment with the higher level of 30 g of silicide dispersion for 5 hours at 200° C. This figure again shows a completely re-mineralized surface of pectolite. Similar remineralization was observed with the core plugs aged in the medium and low gravity crude oils.

Figure 6:
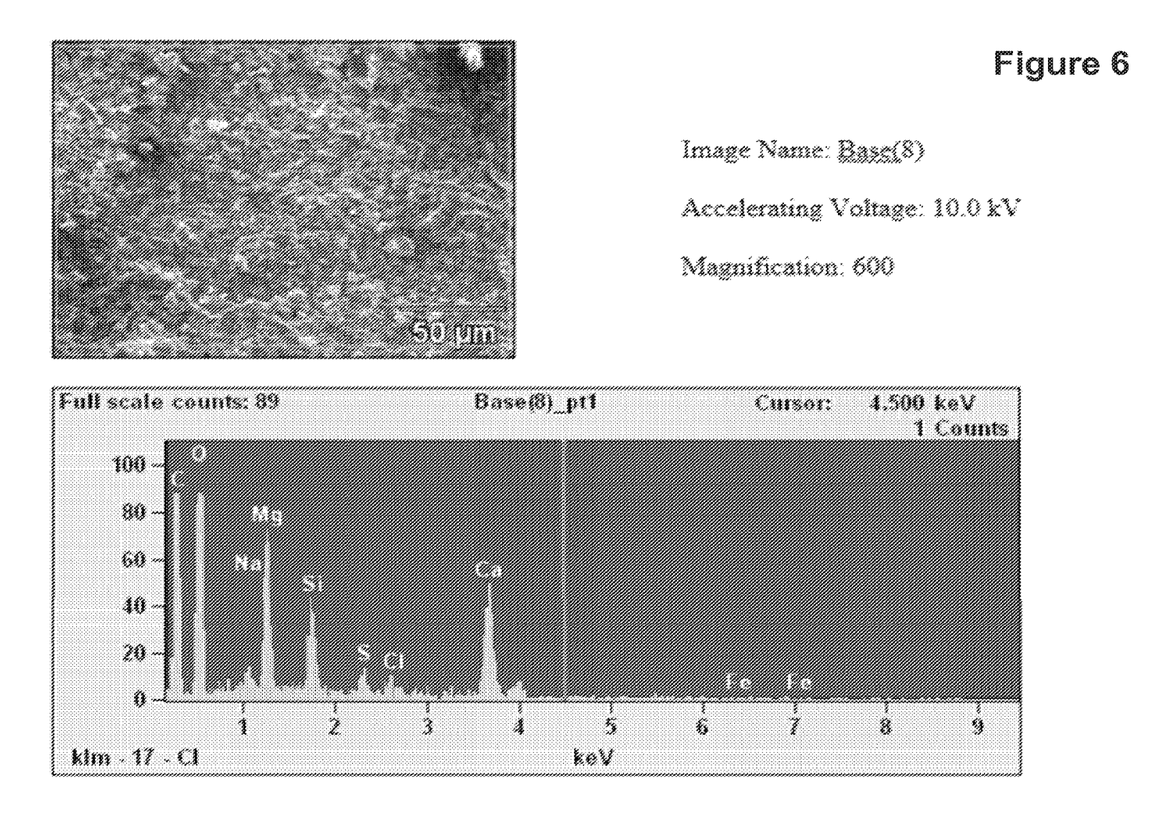
FIG. 6 shows the image and scan of a heavy oil aged core plug after treatment with synthetic sea water at 200° C.

FIG. 6 shows the image and scan of a heavy oil aged core plug subjected to 5 hours at 200° C. in synthetic sea water without any silicide treatment. The composition suggests magnesium and calcium hydroxides and/or carbonates and/or silicates, with lesser amounts of calcium sulfate and sodium chloride. In this case, magnesium now dominates the calcium mineral forms reflecting the synthetic seawater composition. The origin of the observed silica can be from either a minor phase in the core plug or the salts used to make up the synthetic sea water, plus some leaching of the Pyrex glass vessel used to store the synthetic brine is a possibility. Chemical analysis of the synthetic seawater gave a silicon concentration of 7.2 mg/L (15.4 mg $SiO_2$/L). In this case, the ratio of silicon to calcium is slightly less than one. Although subjecting the core plug to elevated temperatures in synthetic sea water without silicide also results in a water wet surface, the mineral composition and appearance is markedly different.

Silicate that is formed from the silicide reaction is readily consumed via the remineralization phenomena on the carbonate surfaces as a result of the high temperatures generated in situ via the silicide reaction. However, the generation of silicate is controlled by the presence of water. With a properly designed hydrocarbon preflush, the silicide dispersion can penetrate deeply into the formation before reacting and releasing the silicate, compared to direct injection of a steam heated or hot water alkaline silicate treatment, which would be readily consumed in the near wellbore area. The silicate from the silicide reaction is released over a longer period and over a larger area to affect wettability over a more significant reaction zone rather than just near the injection point. Similarly to the manner of flooding with a silicide treatment, the generation of heat and hydrogen has the same effect as in a sand formation to mobilize more oil, thereby making silicide a viable methodology for improved recovery of heavy oils from high temperature carbonate formations.

Injecting sodium silicide in a carbonate reservoir formation can alter the wettability of the formation and the ultimate recovery of original or initial oil in place. The increase is due to significant changes in wettability from oil wet to water wet as re-mineralized surfaces that contain the calcium-silicon rich (as seen by the high ratio of silicon to calcium) pectolite phase with some trace amounts of potassium and magnesium are formed. This remineralization results in crystallization that saturates the surface with plate-like structures that are hydrophilic in nature, thereby making the surface water wet.

The claimed invention is:

1. A method of altering a wettability characteristic of a carbonate formation to stimulate oil production, the method comprising:
    selecting an oil bearing carbonate formation;
    injecting a silicide dispersion into the carbonate formation; and
    reacting the injected silicide dispersion within the carbonate formation to re-mineralize the carbonate surface of the carbonate formation as a calcium-silicon phase or a calcium-silicon adduct to alter the wettability characteristic of the carbonate formation toward water wettability.

2. A method of claim 1 further comprising:
    reacting the injected silicide dispersion with water, an alcohol, or an acid.

3. A method of claim 1, wherein the silicide dispersion comprises an alkali metal silicide.

4. A method of claim 3, wherein the alkali metal silicide is sodium silicide.

5. A method of claim 3, wherein the alkali metal silicide is $Na_4Si_4$.

6. A method of claim 1, wherein the silicide dispersion includes a hydrocarbon carrier fluid.

7. A method of claim 1, wherein the silicide dispersion includes a coated silicide.

8. A method of claim 1, wherein the reacting step generates hydrogen, silicate, and heat within the carbonate formation.

9. A method of claim 8 further comprising at least one of:
    pressurizing the carbonate formation with the generated hydrogen;
    heating the carbonate formation with the generated heat; and
    reducing viscosity of hydrocarbons in the carbonate formation with the generated silicate.

10. A method of claim 1 further comprising:
    co-injecting a gas into the carbonate formation.

11. A method of claim 10, wherein the co-injected gas is at least one of nitrogen and oxygen.

12. A method of claim 1 further comprising:
    recovering oil from the carbonate formation with a production well.

13. A method of claim 1, wherein the silicide injection into the carbonate formation includes injecting the silicide dispersion into the carbonate formation in a flooding mode employing separate injection and production wells.

14. A method of claim 1, wherein the silicide injection into the carbonate formation includes injecting the silicide dispersion into the carbonate formation in a cyclic mode of alternating injection, soak, and production periods in a single well used for both injection and production.

15. A method of claim 1, wherein injecting the silicide dispersion into the carbonate formation includes injecting the silicide dispersion into the carbonate formation with hydrocarbon spacer fluids.

16. A method of claim 15, wherein hydrocarbon spacer fluids include at least one of a preflush and a post-flush fluid.

17. A method of claim 1, wherein injecting the silicide dispersion in the oil bearing carbonate formation stimulates additional oil production by at least one of formation pressure increase, oil viscosity reduction, interfacial tension (IFT) alteration, wettability alteration, fluid diversion, and sweep improvement.

18. A method of claim 1, wherein injecting the silicide dispersion in the oil bearing carbonate formation is done in combination with at least one of steam injection, solvent injection, thermal heating of the oil bearing carbonate formation, and chemical treatment of the oil bearing carbonate formation.

19. The method of claim 1, wherein the oil bearing formation comprises a carbonate matrix formation.

20. The method of claim 1, wherein reacting the injected silicide dispersion alters the wettability characteristic of the carbonate formation by at least one of a heat-on-surface effect and an alkali-on-surface effects.

* * * * *